(12) United States Patent
Rao et al.

(10) Patent No.: US 12,730,540 B2
(45) Date of Patent: Sep. 8, 2026

(54) DISPLAY PANEL, METHOD FOR DRIVING DISPLAY PANEL, DRIVING TIME SEQUENCE, AND DISPLAY APPARATUS

(71) Applicants: Hefei Visionox Technology Co., Ltd., Hefei (CN); Visionox Technology Inc., Suzhou (CN)

(72) Inventors: Bo Rao, Hefei (CN); Xiaoxi Sun, Hefei (CN); Chung-Chun Lee, Hefei (CN)

(73) Assignees: Hefei Visionox Technology Co., Ltd., Hefei (CN); Visionox Technology Inc., Suzhou (CN)

( * ) Notice: Subject to any disclaimer, the term of this patent is extended or adjusted under 35 U.S.C. 154(b) by 0 days.

(21) Appl. No.: 18/882,792

(22) Filed: Sep. 12, 2024

(65) Prior Publication Data

US 2025/0335056 A1 Oct. 30, 2025

(30) Foreign Application Priority Data

Apr. 30, 2024 (CN) ........................ 202410548103.5

(51) Int. Cl.
*G06F 3/044* (2006.01)

(52) U.S. Cl.
CPC .................................... *G06F 3/044* (2013.01)

(58) Field of Classification Search
CPC .... G06F 3/044; G06F 3/0412; G06F 3/04166; G06F 3/04184
See application file for complete search history.

(56) References Cited

U.S. PATENT DOCUMENTS

2014/0320427 A1* 10/2014 Lee ..................... G06F 3/04184 345/173
2016/0005352 A1 1/2016 Kim et al.
(Continued)

FOREIGN PATENT DOCUMENTS

CN 107643853 A 1/2018
CN 118251982 A 6/2024
(Continued)

OTHER PUBLICATIONS

Japanese Patent Office, Notice of Reasons for Refusal issued in Japanese Patent Application No. 2025-065208 dated Dec. 2, 2025.
(Continued)

*Primary Examiner* — Yaron Cohen
(74) *Attorney, Agent, or Firm* — Kilpatrick Townsend & Stockton LLP

(57) ABSTRACT

The present application discloses a display panel, a method for driving a display panel, a driving time sequence, and a display apparatus. The display panel includes: a plurality of touch units each including a plurality of touch electrodes arranged along a first direction, here, the plurality of touch units are arranged along a second direction, and the first direction intersects the second direction; and a light-emitting device including a first electrode reused as the touch electrode; here, under a condition that an i-th touch unit is provided with a touch driving voltage, at least one touch unit adjacent to the i-th touch unit is provided with a first voltage, and i is a positive integer; and the first voltage is less than the touch driving voltage. According to the embodiments of the present application, the performance of the display product can be improved.

13 Claims, 6 Drawing Sheets

(56) References Cited

U.S. PATENT DOCUMENTS

| | | | |
|---|---|---|---|
| 2017/0031477 | A1* | 2/2017 | Jamshidi Roudbari ...................... G09G 3/3266 |
| 2019/0025965 | A1 | 1/2019 | Yang et al. |
| 2020/0111844 | A1* | 4/2020 | Jing ...................... G06F 3/0443 |
| 2020/0272280 | A1 | 8/2020 | Liu et al. |

FOREIGN PATENT DOCUMENTS

| | | | |
|---|---|---|---|
| CN | 119225550 | A | 12/2024 |
| CN | 119866136 | A | 4/2025 |
| JP | 2016164742 | A | 9/2016 |
| JP | 2018163451 | A | 10/2018 |
| WO | 2012147634 | A1 | 11/2012 |
| WO | 2024251273 | A1 | 12/2024 |
| WO | 2024255807 | A1 | 12/2024 |
| WO | 2024255889 | A1 | 12/2024 |
| WO | 2025025824 | A1 | 2/2025 |
| WO | 2025194620 | A1 | 9/2025 |

OTHER PUBLICATIONS

Japanese Patent Office, Decision of Refusal issued in Japanese patent application No. 2025-065208 dated Apr. 28, 2026.

* cited by examiner

Providing, under a condition that an i-th touch channel is provided with a touch driving voltage, a first voltage to at least one touch channel adjacent to the i-th touch channel, here, the first voltage is less than the touch driving voltage

S80

DISPLAY PANEL, METHOD FOR DRIVING DISPLAY PANEL, DRIVING TIME SEQUENCE, AND DISPLAY APPARATUS

CROSS REFERENCE TO RELATED APPLICATION

The present application claims priority to Chinese Patent Application No. 202410548103.5 filed on Apr. 30, 2024, and titled "DISPLAY PANEL, METHOD FOR DRIVING DISPLAY PANEL, DRIVING TIME SEQUENCE, AND DISPLAY APPARATUS", which is incorporated herein by reference in its entirety.

TECHNICAL FIELD

The present application relates to the field of display technology, and particularly to a display panel, a method for driving a display panel, a driving time sequence, and a display apparatus.

BACKGROUND

Planar display apparatus based on Organic Light Emitting Diode (OLED) and Light Emitting Diode (LED), etc., are widely used in cell phones, TVs, notebook computers, desktop computers and other consumer electronic products due to their high image quality, power saving, thin body and wide range of applications, and have become the mainstream of the display apparatus.

However, the performance of current OLED display products needs to be improved.

SUMMARY

Embodiments of the present application provide a display panel, a method for driving a display panel, a driving time sequence, and a display apparatus, which can improve the performance of a display product.

In a first aspect, the embodiments of the present application provide a display panel including: a plurality of touch units each including a plurality of touch electrodes arranged along a first direction, here, the plurality of touch units are arranged along a second direction, and the first direction intersects the second direction; and a light-emitting device including a first electrode reused as the touch electrode; here, under a condition that an i-th touch unit is provided with a touch driving voltage, at least one touch unit adjacent to the i-th touch unit is provided with a first voltage, and i is a positive integer; and the first voltage is less than the touch driving voltage.

Based on the same inventive concept, in a second aspect, the embodiments of the present application further provide a display panel including:

a plurality of touch units each including a plurality of touch electrodes arranged along a first direction, here, the plurality of touch units are arranged along a second direction, and the first direction intersects the second direction; and a light-emitting device including a first electrode reused as the touch electrode;

here, under a condition that an i-th touch unit is provided with a touch driving voltage, one touch unit adjacent to the i-th touch unit is provided with a first voltage, and another touch unit adjacent to the i-th touch unit is provided with a second voltage; and the first voltage is less than the touch driving voltage, and the second voltage is less than the touch driving voltage.

Based on the same inventive concept, in a third aspect, the embodiments of the present application further provide a display panel including: a substrate;

a light-emitting device located on a side of the substrate, here, the light-emitting device includes a first electrode, first electrodes of different light-emitting devices are isolated through an isolation structure, and the first electrode is reused as a touch electrode;

a plurality of touch electrodes arranged along a first direction are one touch unit, here, a plurality of touch units are arranged along a second direction, and the first direction intersects the second direction;

here, under a condition that an i-th touch unit is provided with a touch driving voltage, at least one touch unit adjacent to the i-th touch unit is provided with a first voltage, and i is a positive integer; and the first voltage is less than the touch driving voltage.

Based on the same inventive concept, in a fourth aspect, the embodiments of the present application further provide a display apparatus including the display panel according to any of the embodiments described in the first aspect or the second aspect or the third aspect.

Based on the same inventive concept, in a fifth aspect, the embodiments of the present application further provide a method for driving a display panel, and the display panel includes:

a plurality of touch units each including a plurality of touch electrodes arranged along a first direction, here, the plurality of touch units are arranged along a second direction, and the first direction intersects the second direction; and a light-emitting device including a first electrode reused as the touch electrode;

the method includes:

providing, under a condition that a touch driving voltage is provided to an i-th touch unit, a first voltage to at least one touch unit adjacent to the i-th touch unit;

here, the first voltage is between the touch driving voltage and the first power supply voltage.

Based on the same inventive concept, in a sixth aspect, the embodiments of the present application further provide a driving time sequence configured to drive the display panel according to any of the embodiments of the first aspect, and the driving time sequence includes:

in a touch scanning stage of the i-th touch unit, a time division multiplexing control signal of the i-th touch unit is an OFF-level, and a touch electrode of the i-th touch unit is inputted with the touch driving voltage;

a time division multiplexing control signal of a touch unit adjacent to the i-th touch unit is the OFF-level, and a touch electrode of the touch unit adjacent to the i-th touch unit is inputted with the first voltage;

the first voltage is less than the touch driving voltage; and preferably, in the touch scanning stage of the i-th touch unit, a time division multiplexing control signal of a touch unit not adjacent to the i-th touch unit is an ON-level, and a touch electrode of the touch unit not adjacent to the i-th touch unit is inputted with a first power supply voltage, the first voltage is greater than the first power supply voltage.

With the display panel, the method for driving the display panel, the driving time sequence, and the display apparatus according to the embodiments of the present application, since under a condition that the i-th touch unit is provided with the touch driving voltage, the touch unit adjacent to the i-th touch unit is provided with the first voltage, and the first voltage is less than the touch driving voltage, the embodiments of the present application may be beneficial for reducing a voltage difference between a currently scanned i-th touch unit and its adjacent touch unit, the currently scanned i-th touch unit may be in a stable voltage difference environment, and a risk of the currently scanned i-th touch unit being broken down can be reduced, so that a touch effect is improved, the possibility of display panel failure is reduced, and the performance of the display panel is improved.

The above description is merely an overview of the technical solutions of the present application. In order to make the technical means of the present application understood more clearly and implemented according to the contents of the description, and in order to make the above and other objects, features and advantages of the present application understood more obviously, specific detailed description of the present application are particularly provided below.

BRIEF DESCRIPTION OF THE DRAWINGS

Other features, objects and advantages of the present application will become more apparent from reading the following detailed description of the non-limiting embodiments with reference to the accompanying drawings, in which the same or similar reference numerals represent the same or similar features, and the accompanying drawings are not drawn to actual scale.

REFERENCE NUMERALS

100: Display panel;

10: Touch unit; 11: Touch electrode;

20: Light-emitting device; 21: First electrode; 22: Light-emitting layer; 23: Second electrode;

30: Pixel circuit;

41: Pixel definition portion; 42: Isolation structure; 421: First isolation portion; 422: Second isolation portion;

50: Gating circuit;

60: Sensing channel; 61: Sensing electrode;

200: Driving chip; 201: First type pin; 202: Second type pin; and

1000: Display apparatus.

DETAILED DESCRIPTION

Features and exemplary embodiments of various aspects of the present application will be described in detail below. In order to make the objects, technical solutions and advantages of the present application clearer, the present application is further described in detail below with reference to the accompanying drawings and specific embodiments. It should be understood that the specific embodiments described herein are only used to explain the present application, but not to limit the present application. For those skilled in the art, the present application can be implemented without some of these specific details. The following description of the embodiments is only to provide a better understanding of the present application by illustrating examples of the present application.

It will be apparent to those skilled in the art that various modifications and variations can be made to the present application without departing from the gist or scope of the present application. Accordingly, the present application is intended to encompass the modifications and variations to the present application that fall within the scope of the appended claims (the claimed technical solutions) and equivalents thereof. It should be noted that the implementations provided by the embodiments of the present application can be combined with one another if there is no conflict.

With the development of display technology, In cell touch technology has emerged in which a touch layer may be moved into an encapsulation layer. In a touch scanning stage, a row scanning may be performed on touch electrodes to recognize a touch location. However, in the related art, a voltage difference between a currently scanned row and a non-scanned row is relatively great, and an electrostatic signal is accumulated, so that an electrostatic breakdown easily occurs between an electrode of a scanned touch electrode and a non-scanned touch electrode, resulting in a product losing a touch recognition function.

In order to solve the above technical problem, the embodiments of the present application provide a display panel, a method for driving a display panel, and a display apparatus, which will be described below with reference to the accompanying drawings.

Figure 1:
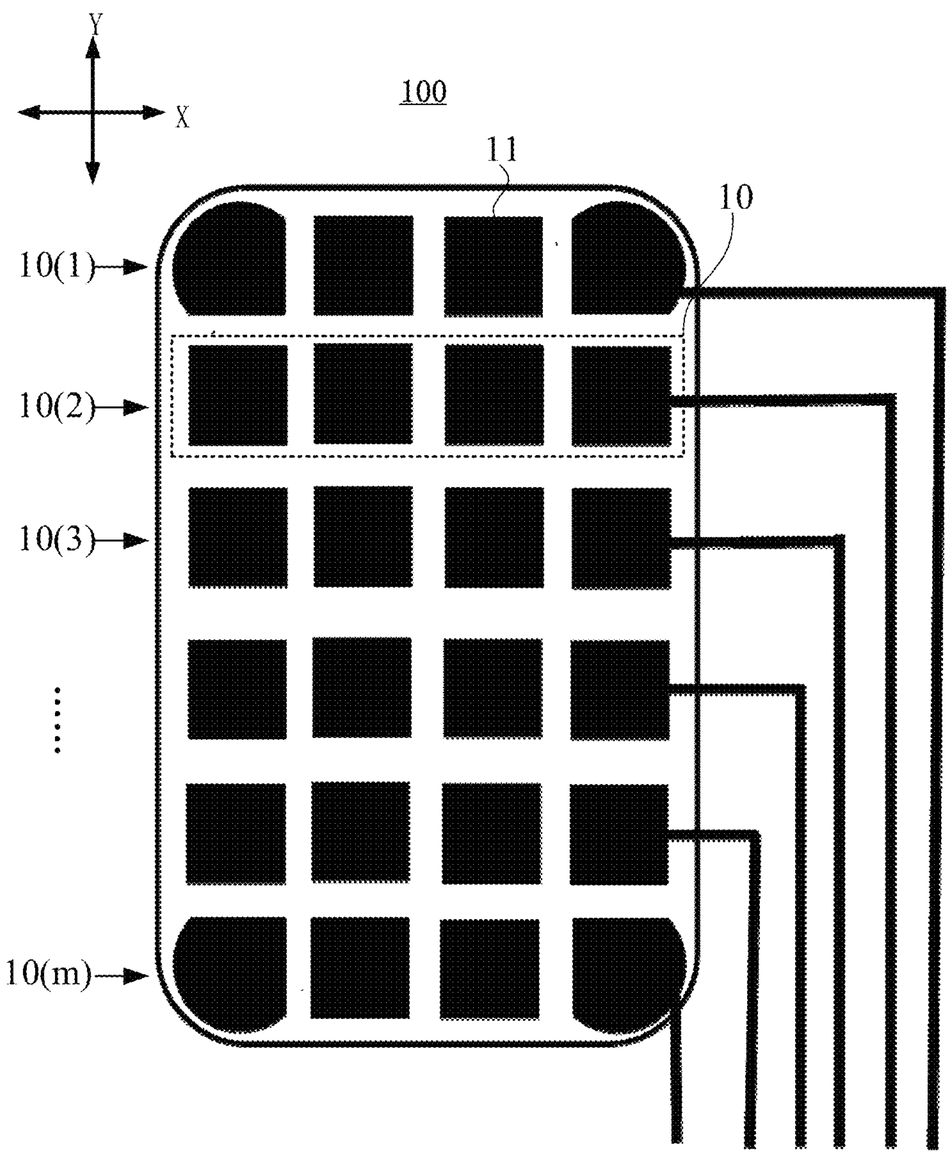
FIG. 1 shows a schematic structural top view of a display panel according to embodiments of the present application.
Figure 2:
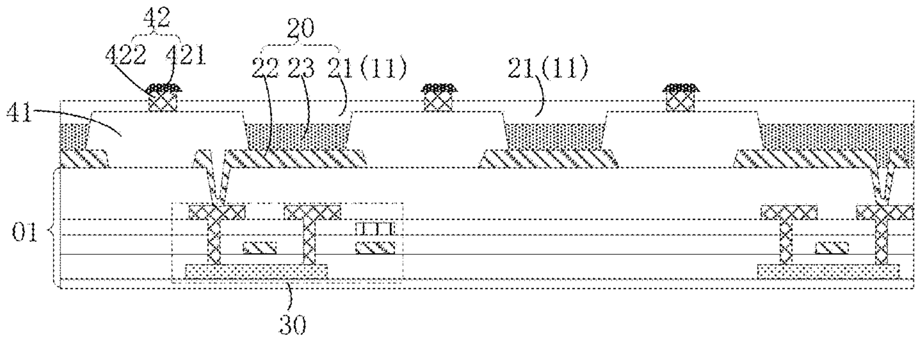
FIG. 2 shows a schematic structural sectional view of a display panel according to embodiments of the present application.

Referring to FIG. 1 and FIG. 2, a display panel 100 according to the embodiments of the present application includes a touch unit 10 and a light-emitting device 20.

The touch unit 10 includes a plurality of touch electrodes 11 arranged along a first direction X, a plurality of touch units 10 are arranged along a second direction Y, and the first direction X intersects the second direction Y.

In an example, the first direction X may be a row direction, the second direction Y may be a column direction, and the plurality of touch electrodes 11 arranged in one row may be connected to each other to constitute one touch unit 10. Under a condition that a touch recognition is performed, the touch units may be scanned progressively. Under a condition that the touch unit is scanned, all of the plurality of touch electrodes within the touch unit are provided with a touch driving voltage.

For example, m touch units 10 are arranged along the second direction Y, touch units 10 from a first touch unit 10 (1) to an m-th touch unit 10 ($m$) may also be referred to as touch units 10 from a first row of touch unit 10 (1) to an m-th row of touch unit 10 (*m*), and under a condition that the touch recognition is performed, the touch driving voltage may be provided to the touch units 10 from the first row of touch unit 10 (1) to the m-th row of touch unit 10 (*m*) in sequence, so that a touch scanning is performed progressively.

It should be noted that the row direction and the column direction may be interchanged.

The light-emitting device 20 includes a first electrode 21, and here, the first electrode 21 is reused as the touch electrode 11.

Light-emitting devices 20 are arranged in an array along the first direction X and the second direction Y. An example is given in which the first direction X is the row direction, as an example, a number of rows of the light-emitting devices 20 is equal to a number of rows of the touch units 10, and under this condition, first electrodes 21 of a plurality of light-emitting devices 20 in one row are reused as one row of touch electrodes 11. As another example, the number of rows of the light-emitting devices 20 is greater than the number of rows of the touch units 10, and under this condition, first electrodes 21 of a plurality of light-emitting devices 20 in a plurality of rows are reused as one row of touch electrodes 11.

Under a condition that an i-th touch unit 10 (*i*) is provided with a touch driving voltage, at least one touch unit 10 adjacent to the i-th touch unit 10 (*i*) is provided with a first voltage, here, the first voltage is less than the touch driving voltage.

The embodiments of the present application may be beneficial for reducing a voltage difference between a currently scanned i-th touch unit and its adjacent touch unit, the currently scanned i-th touch unit may be in a stable voltage difference environment, and a risk of the currently scanned i-th touch unit being broken down can be reduced, so that a touch effect is improved, the possibility of display panel failure is reduced, and the performance of the display panel is improved.

In an example, under a condition that the i-th touch unit 10 (*i*) is provided with the touch driving voltage, a touch unit not adjacent to the i-th touch unit 10 (*i*) is provided with a first power supply voltage, and the first voltage is greater than the first power supply voltage.

The i-th touch unit 10 (*i*) may be any of the touch units 10 from the first touch unit 10 (1) to the m-th touch unit 10 (*m*).

Under a condition that i=1, a touch unit 10 adjacent to the first touch unit 10 (1) includes a second touch unit 10 (2), and touch units 10 not adjacent to the first touch unit 10 (1) include touch units 10 from a third touch unit 10 (3) to the m-th touch unit 10 (*m*).

Under a condition that i=2, touch units 10 adjacent to a second touch unit 10 (2) include the first touch unit 10 (1) and the third touch unit 10 (3), and touch units 10 not adjacent to the second touch unit 10 (2) include touch units 10 from a fourth touch unit 10 (4) to the m-th touch unit 10 (*m*).

By analogy, under a condition that i=m, a touch unit 10 adjacent to the m-th touch unit 10 (*m*) includes an (m−1)-th touch unit 10 (m−1), and touch units 10 not adjacent to the m-th touch unit 10 (*m*) include touch units 10 from the first touch unit 10 (1) to an (m−2)-th touch unit 10 (m−2).

Figure 3:
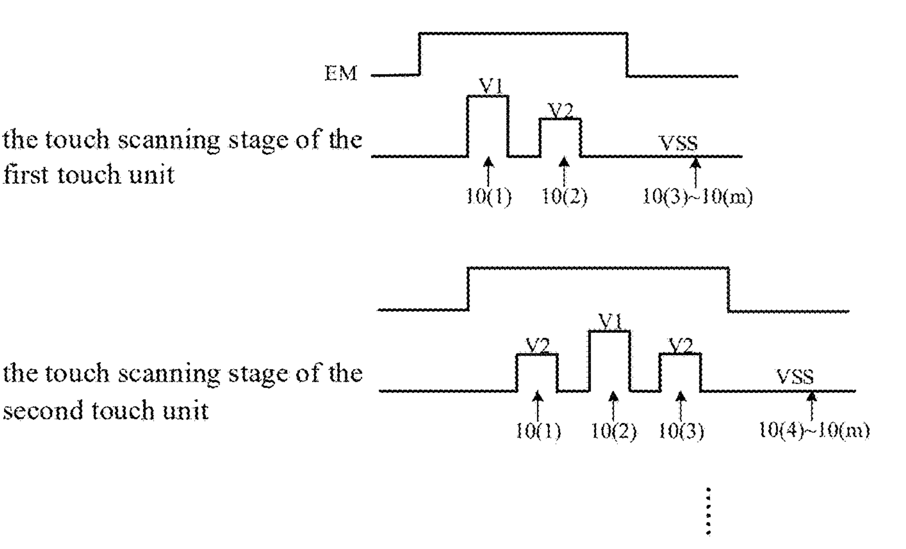
FIG. 3 shows a schematic view of a time sequence of a display panel according to embodiments of the present application.
Figure 3:
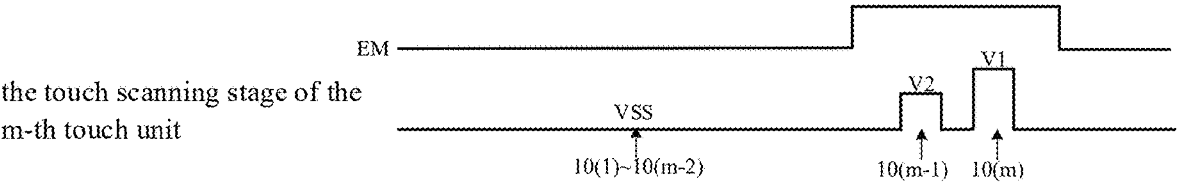

As an example, as shown in FIG. 3, under a condition that the touch recognition is performed, the touch units 10 from the first touch unit 10 (1) to the m-th touch unit 10 (*m*) may be scanned in sequence. It should be noted that, in FIG. 3, V1 represents a touch driving voltage, V2 represents a first voltage, and VSS represents a first power supply voltage.

As shown in FIG. 3, under a condition that the touch scanning is performed on the first touch unit 10 (1), a driving chip may provide the touch driving voltage to the first touch unit 10 (1), and the first touch unit 10 (1) is provided with the touch driving voltage V1. Meanwhile, the second touch unit 10 (2) adjacent to the first touch unit 10 (1) is provided with the first voltage V2, and touch units 10 from a third touch unit 10 (3) to the m-th touch unit 10 (*m*) not adjacent to the first touch unit 10 (1) are provided with the first power supply voltage VSS.

Under a condition that the touch scanning is performed on the second touch unit 10 (2), the driving chip may provide the touch driving voltage to the second touch unit 10 (2), and the second touch unit 10 (2) is provided with the touch driving voltage V1. Meanwhile, the first touch unit 10 (1) and the third touch unit 10 (3) adjacent to the second touch unit 10 (2) are provided with the first voltage V2, and touch units 10 from the fourth touch unit 10 (4) to the m-th touch unit 10 (*m*) not adjacent to the second touch unit 10 (2) are provided with the first power supply voltage VSS.

Under a condition that the touch scanning is performed on the m-th touch unit 10 (*m*), the driving chip may provide the touch driving voltage to the m-th touch unit 10 (*m*), and the m-th touch unit 10 (*m*) is provided with the touch driving voltage V1. Meanwhile, the (m−1)-th touch unit 10 (m−1) adjacent to the m-th touch unit 10 (*m*) is provided with the first voltage V2, and touch units 10 from the first touch unit 10 (1) to the (m−2)-th touch unit 10 (m−2) not adjacent to the m-th touch unit 10 (*m*) are provided with the first power supply voltage VSS.

With the display panel according to the embodiments of the present application, since under a condition that the i-th touch unit 10 (*i*) is provided with the touch driving voltage, at least one touch unit 10 adjacent to the i-th touch unit 10 (*i*) is provided with the first voltage between the touch driving voltage and the first power supply voltage, and the touch unit 10 adjacent to the i-th touch unit 10 (*i*) is provided with the first power supply voltage, in the embodiments of the present application, a voltage difference between a currently scanned i-th touch unit 10 (*i*) and its adjacent touch unit can be reduced, the currently scanned i-th touch unit 10 (*i*) may be in a stable voltage difference environment, and a risk of the currently scanned i-th touch unit 10 (*i*) being broken down can be reduced, so that a touch effect is improved, the possibility of display panel failure is reduced, and the performance of the display panel is improved.

In some embodiments, as shown in FIG. 2, the light-emitting device 20 may further include a light-emitting layer 22 and a second electrode 23, and the first electrode 21, the light-emitting layer 22, and the second electrode 23 are stacked. In an example, the first electrode 21 may be a cathode, and the second electrode 22 may be an anode. The first electrodes 21 of at least a part of the different light-emitting devices 20 may be disconnected from each other, so that the first electrodes 21 of the different light-emitting devices 20 may be respectively reused as the touch electrodes 11 within the different touch units 10.

As an example, as shown in FIG. 2, the display panel may include a substrate 01, and the light-emitting device 20 may be located on a side of the substrate 01. The substrate 01 may include a pixel circuit 30. The pixel circuit 30 is connected to the second electrode of the light-emitting device 20 to drive the light-emitting device to emit light.

The display panel may further include a pixel definition portion 41 and an isolation structure 42. The pixel definition portion 41 may include a pixel opening, the light-emitting layer 22 may be provided within the pixel opening.

The first electrodes 21 of different light-emitting devices 20 may be disconnected from each other through the isolation structure 42. For example, the isolation structure 42 may include a first isolation portion 421 and a second isolation portion 422.

For example, the first isolation portion 421 and the second isolation portion 422 may be insulation portions. The first electrode 21 is overlapped with the first isolation portion 421.

It should be noted that the way in which the first electrodes 21 of the light-emitting devices 20 shown in FIG. 2 are disconnected from each other is merely an example, and the structure shown in FIG. 2 is not intended to limit the present application.

For example, reference may be made to patent CN118251982A, patent 202410864269.8, patent PCT/CN2024/098407, patent PCT/CN2024/102783, patent PCT/CN2024/098217, patent PCT/CN2024/099419, and patent PCT/CN2024/099072 for the related technical solutions of the isolation structure.

In some embodiments, the first electrode 21 may be a cathode, and the second electrode 23 may be an anode. Under a condition that the display is performed, the first power supply voltage provided to the first electrode 21 may be a negative voltage or a voltage of 0 V. Under a condition that the touch scanning is performed, the first electrode 21 is reused as the touch electrode, and the touch driving voltage provided to the touch electrode is a positive voltage. Under this condition, the touch driving voltage is greater than the first voltage, and the first voltage is greater than the first power supply voltage. As such, the first voltage is between the touch driving voltage and the first power supply voltage to reduce a voltage difference between the currently scanned touch unit and its adjacent touch unit.

Optionally, under a condition that the first power supply voltage is the negative voltage, the first voltage may be greater than 0 V.

Of course, in other examples, the touch driving voltage may be less than the first voltage, and the first voltage is less than the first power supply voltage, so that the first voltage is also between the touch driving voltage and the first power supply voltage.

In some embodiments, a difference between the touch driving voltage and the first voltage is a first difference, a difference between the first voltage and the first power supply voltage is a second difference, and an absolute value of the first difference is less than an absolute value of the second difference. As such, the first voltage is closer to the touch driving voltage, so that the voltage difference between the currently scanned touch unit and its adjacent touch unit is less, which is more beneficial for reducing the risk of the currently scanned touch unit being broken down, thereby better protecting the currently scanned touch unit.

It may be understood that under a condition that the currently scanned touch unit performs the touch recognition operation, turning on of its adjacent touch unit may be considered that its adjacent touch unit has not performed the touch recognition operation. Therefore, under a condition that a touch unit adjacent to the currently scanned touch unit is provided with the first voltage, and the first voltage is relatively close to the touch voltage, although a voltage difference between a touch unit provided with the first voltage and a touch unit provided with the first power supply voltage is relatively large with respect to a voltage difference between a touch unit provided with the first voltage and a touch unit provided with the touch driving voltage, a touch recognition effect is not affected since the touch unit provided with the first voltage has not performed the touch recognition operation.

Figure 4:
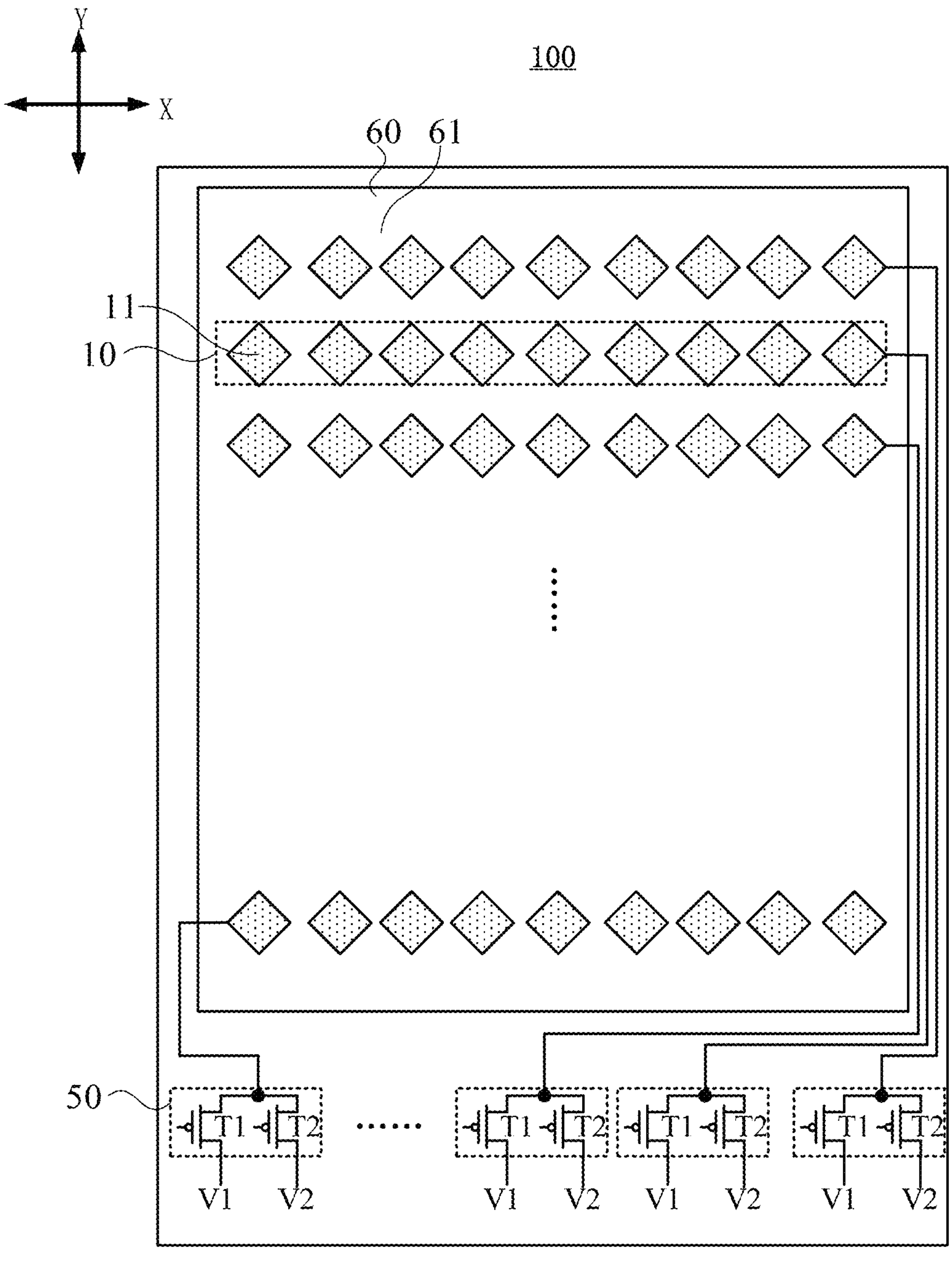
FIG. 4 shows another schematic structural top view of a display panel according to embodiments of the present application.

In some embodiments, as shown in FIG. 4, the display panel may further include a gating circuit 50 that may include one output terminal and two input terminals, the output terminal of the gating circuit 50 is connected to the touch unit 10, a first input terminal of the gating circuit 50 is provided with the touch driving voltage V1, and a second input terminal of the gating circuit 50 is provided with the first voltage V2.

Under a condition that the first input terminal and the output terminal of the gating circuit 50 are turned on, the touch driving voltage V1 is transmitted to the touch unit 10, so that the touch unit 10 is provided with the touch driving voltage V1. Under a condition that the second input terminal and the output terminal of the gating circuit 50 are turned on, the first voltage V2 is transmitted to the touch unit 10, so that the touch unit 10 is provided with the first voltage V2.

It may be understood that, for a touch unit, it needs to be provided with the touch driving voltage, the first voltage, and the first power supply voltage in a time-sharing manner. Under a condition that the touch unit is used as a touch unit on which a current touch scanning is performed, the touch unit is provided with the touch driving voltage, under a condition that the touch unit is used as a touch unit adjacent to the touch unit on which the current touch scanning is performed, the touch unit is provided with the first voltage, and under a condition that the touch unit is used as a touch unit not adjacent to the touch unit on which the current touch scanning is performed, the touch unit is provided with the first power supply voltage.

In the embodiments of the present application, by providing the gating circuit, it may be convenient to control the touch unit to be provided with different voltage signals in a time-sharing manner.

In an example, the gating circuit 50 and the touch unit 10 may be provided in a one-to-one correspondence. The output terminal of the gating circuit 50 may be connected to the touch unit 10 through a connection line. The input terminals of the gating circuit 50 are electrically connected to pins of the driving chip. Here, the first input terminal and the second input terminal of the gating circuit 50 may be connected to different pins, that is, the touch driving voltage and the first voltage may be provided by different pins.

Optionally, the first input terminal of the gating circuit 50 may be provided with the touch driving voltage V1 and the first power supply voltage VSS in a time-sharing manner, so that the first input terminal of the gating circuit 50 is reused in a time-sharing manner to simplify a structure of the display panel. In addition, a pin of the driving chip connected to the first input terminal of the gating circuit 50 may provide the touch driving voltage V1 and the first power supply voltage VSS in a time-sharing manner.

Of course, in other examples, the input terminals of the gating circuit 50 may not be reused in a time-sharing manner, for example, the gating circuit 50 may further include a third input terminal provided with the first power supply voltage.

As an example, the touch driving voltage, the first voltage, and the first power supply voltage may be provided by the same driving chip.

As another example, the touch driving voltage, the first voltage, and the first power supply voltage may be provided by different driving chips. For example, the touch driving voltage and the first voltage are provided by one driving chip, and the first power supply voltage is provided by the other driving chip.

In an example, as shown in FIG. 4, the gating circuit 50 may include a first transistor T1 and a second transistor T2, a first electrode of the first transistor T1 and a first electrode of the second transistor T2 are connected to each other and used as the output terminal of the gating circuit 50, a second electrode of the first transistor T1 is used as the first input terminal of the gating circuit 50, and a second electrode of the second transistor T2 is used as the second input terminal of the gating circuit 50.

Under a condition that the i-th touch unit is scanned, a first transistor T1 connected to the i-th touch unit is turned on, and a second transistor T2 connected to the i-th touch unit is turned off, so that the i-th touch unit is provided with the touch driving voltage; meanwhile, a first transistor T1 connected to a touch unit adjacent to the i-th touch unit is turned off, and a second transistor T2 connected to the touch unit adjacent to the i-th touch unit is turned on, so that the touch unit adjacent to the i-th touch unit is provided with the first voltage. In addition, under a condition that the first input terminal of the gating circuit 50 is provided with the touch driving voltage V1 and the first power supply voltage VSS in a time-sharing manner, and the i-th touch unit is scanned, a first transistor T1 connected to a touch unit not adjacent to the i-th touch unit is turned on, a second electrode of the first transistor T1 is provided with the first power supply voltage VSS, and a second transistor T2 connected to the touch unit not adjacent to the i-th touch unit is turned off, so that the touch unit not adjacent to the i-th touch unit is provided with the first power supply voltage.

With the development of display technology, functions of the display panel become more and more diversified, and thus operating conditions of the display panel become more and more diversified. For example, the display panel may support operating conditions with a plurality of refresh frequencies and a plurality of brightness modes. However, environments of the touch unit are different under different operating conditions.

In some embodiments, the display panel includes a first operating condition and a second operating condition, and magnitudes of first voltages under the first operating condition and the second operating condition may be different. As such, the magnitudes of the first voltages may be flexibly set according to the environments of the touch unit under different operating conditions to flexibly adjust touch effects under different operating conditions.

Optionally, magnitudes of touch driving voltages under the first operating condition and the second operating condition may be the same. Therefore, the same magnitude of touch driving voltages are provided under different operating conditions, and only the magnitude of the first voltage needs to be adjusted, which is beneficial for simplifying a driving time sequence.

Optionally, magnitudes of the first power supply voltages under the first operating condition and the second operating condition may be set according to actual requirements. For example, from the perspective of simplifying the driving time sequence, the magnitudes of the first power supply voltages under the first operating condition and the second operating condition may be the same. As another example, from the perspective of optimizing display effects or power consumption under different operating conditions, the magnitudes of the first power supply voltages under the first operating condition and the second operating condition may be different.

In some embodiments, different operating conditions may include operating conditions with different refresh frequencies. For example, a refresh frequency of the display panel under the first operating condition and a refresh frequency of the display panel under the second operating condition are different. Here, the refresh frequency may refer to a refresh frequency of a display image or a refresh frequency of the touch scanning. The greater the refresh frequency is, the shorter a duration required for one frame is. Under a condition that the i-th touch unit is touch scanned, the i-th touch unit needs to be provided with the touch driving voltage, then under a condition that an (i+1)-th touch unit is touch scanned, the i-th touch unit needs to be provided with the first voltage, and the greater the refresh frequency is, the shorter a duration for the voltage provided to the i-th touch unit changing from the touch driving voltage to the first voltage is.

In an example, a voltage difference between the touch driving voltage and the first voltage under the first operating condition is ΔV21, a voltage difference between the touch driving voltage and the first voltage under the second operating condition is ΔV22, and under a condition that a refresh frequency of the display panel under the first operating condition is greater than a refresh frequency of the display panel under the second operating condition, $|\Delta V21|<|\Delta V22|$.

It may be understood that the less the absolute value of a difference between the touch driving voltage and the first voltage is, the closer the magnitudes of the touch driving voltage and the first voltage are. In the embodiments of the present application, the greater the refresh frequency is, the closer the first voltage is to the touch driving voltage, which is beneficial for the voltage provided to the touch unit to sufficiently change between the touch driving voltage and the first voltage in a relatively short duration.

In an example, under a condition that the touch driving voltage is greater than the first voltage, the voltage provided to the touch unit is changed from the touch driving voltage to the first voltage, and this process may be referred to as an electrode discharging process, and the changed voltage may be referred to as a "fall back voltage". The greater the refresh frequency, the less the desired "fall back voltage" is. Under this condition, the greater the refresh frequency is, the greater the first voltage may be. In addition, the touch driving voltage may not change as the refresh frequency changes.

Figure 5:
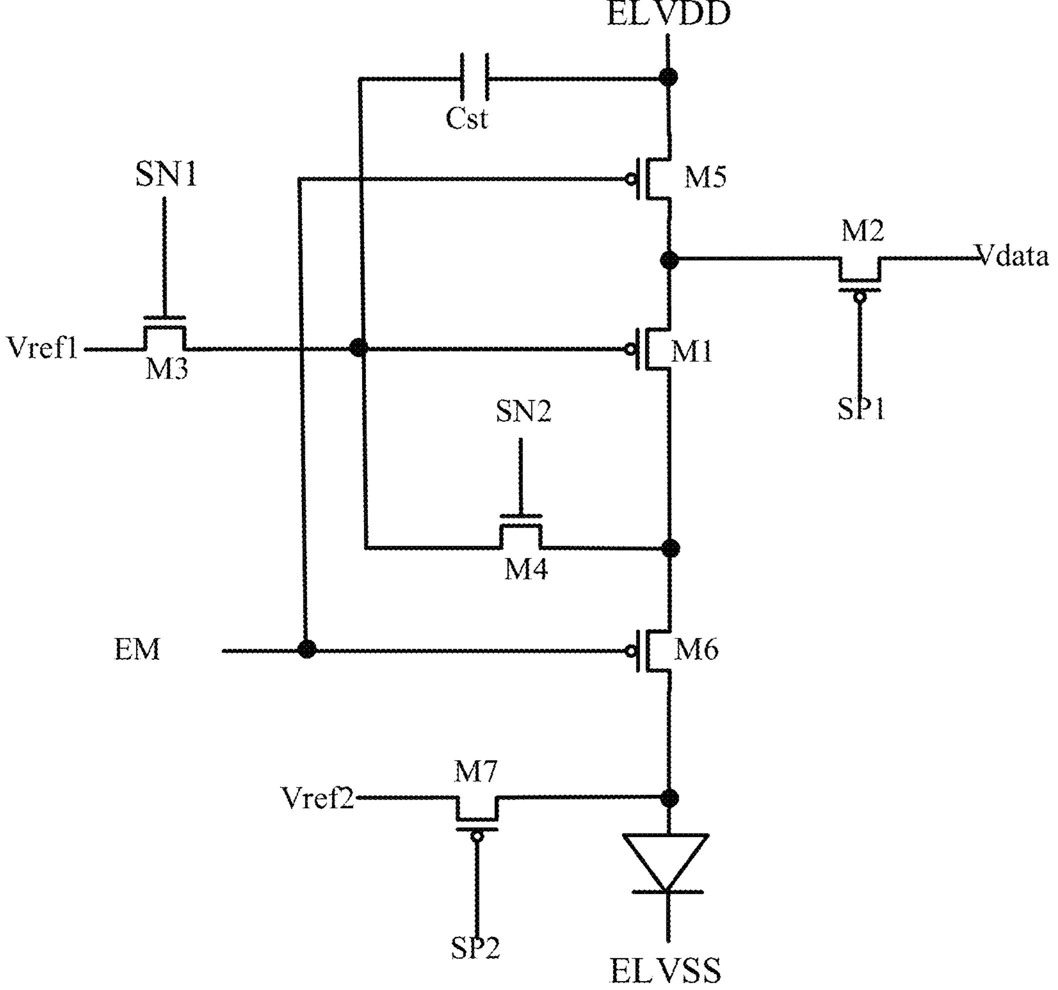
FIG. 5 shows a schematic structural view of a pixel circuit in a display panel according to embodiments of the present application.

In some embodiments, as shown in FIG. 2 and FIG. 5, the display panel includes a pixel circuit 30 connected to the light-emitting device 20, the pixel circuit 30 is provided with a light-emitting control signal EM, and the light-emitting control signal EM is configured to control whether the light-emitting device 20 emits light. The first electrodes of the light-emitting devices 20 are reused as the touch electrodes in the touch unit, and the touch unit may be considered to be electrically connected to the pixel circuit 30.

In an example, the first electrode of the light-emitting device 20 is connected to a first wiring ELVSS, the second electrode of the light-emitting device 20 is connected to a second wiring ELVDD through the pixel circuit 30, the first wiring ELVSS may transmit the first power supply voltage, the touch driving voltage, and the first voltage in a time-sharing manner, the second wiring ELVDD is configured to transmit a second power supply voltage, and the second power supply voltage may be a positive voltage.

Under a condition that the light-emitting control signal EM is an ON-level, a driving current generated by the pixel circuit 30 may be transmitted to the light-emitting device 20, and the light-emitting device 20 emits light. Under a condition that the light-emitting control signal EM is an OFF-level, the light-emitting device 20 does not emit light.

In FIG. 5, SN1, SN2, SP1, and SP2 represent scanning signals, Vref1 and Vref2 represent reset signals, and Vdata represents a data signal.

It should be noted that the structure of the pixel circuit 30 shown in FIG. 5 is merely an example and is not intended to limit the present application, and the pixel circuit 30 may have a structure other than shown FIG. 5 without departing from the technical concept of the present application.

The light-emitting control signal EM may also be referred to as a time division multiplexing control signal.

As shown in FIG. 3, under a condition that the i-th touch unit is provided with the touch driving voltage, the light-emitting control signal EM provided to the pixel circuit connected to the i-th touch unit is the OFF-level. Therefore, under a condition that the light-emitting device is in a non-light-emitting state, the touch recognition is performed, so that the first electrode of the light-emitting element is reused as the touch electrode in a time-sharing manner to ensure that the touch recognition can be performed on a currently touch scanned row, and the display function of other rows of the display panel is not affected.

In an example, under a condition that a touch unit adjacent to the i-th touch unit is provided with the first voltage, the light-emitting control signal EM provided to the pixel circuit connected to the touch unit adjacent to the i-th touch unit is the OFF-level. Therefore, under a condition that the touch scanning is performed on the i-th touch unit, light-emitting devices corresponding to the i-th touch unit and the touch unit adjacent to the i-th touch unit are in the non-light-emitting state, so that the environment where the i-th touch unit is located is more stable, thereby beneficial for improving the touch effect.

In an example, under a condition that a touch unit adjacent to the i-th touch unit is provided with the first voltage, the light-emitting control signal provided to the pixel circuit connected to a touch unit not adjacent to the i-th touch unit is the ON-level. Under a condition that the touch scanning is performed on the i-th touch unit, light-emitting devices corresponding to the touch unit not adjacent to the i-th touch unit may be in a light-emitting state, so as to ensure the display effect of the display panel.

The light-emitting devices corresponding to the touch unit may refer to light-emitting devices corresponding to the first electrodes reused as the touch electrodes.

For example, first electrodes of light-emitting devices in a j-th row are reused as the i-th touch unit, then the light-emitting devices corresponding to the i-th touch unit are the light-emitting devices in the j-th row, and the pixel circuits connected to the i-th touch unit are the pixel circuits connected to the light-emitting devices in the j-th row. Here, j and i may or may not be equal.

As an example, as shown in FIG. 1 and FIG. 4, the display panel may have a self-capacitance touch structure. It should be noted that only a part of the touch electrode connection wirings are shown in FIG. 1 and FIG. 4, and it may be understood that each touch electrode is connected to a corresponding wiring, and different touch electrodes are connected to different wirings.

Figure 6:
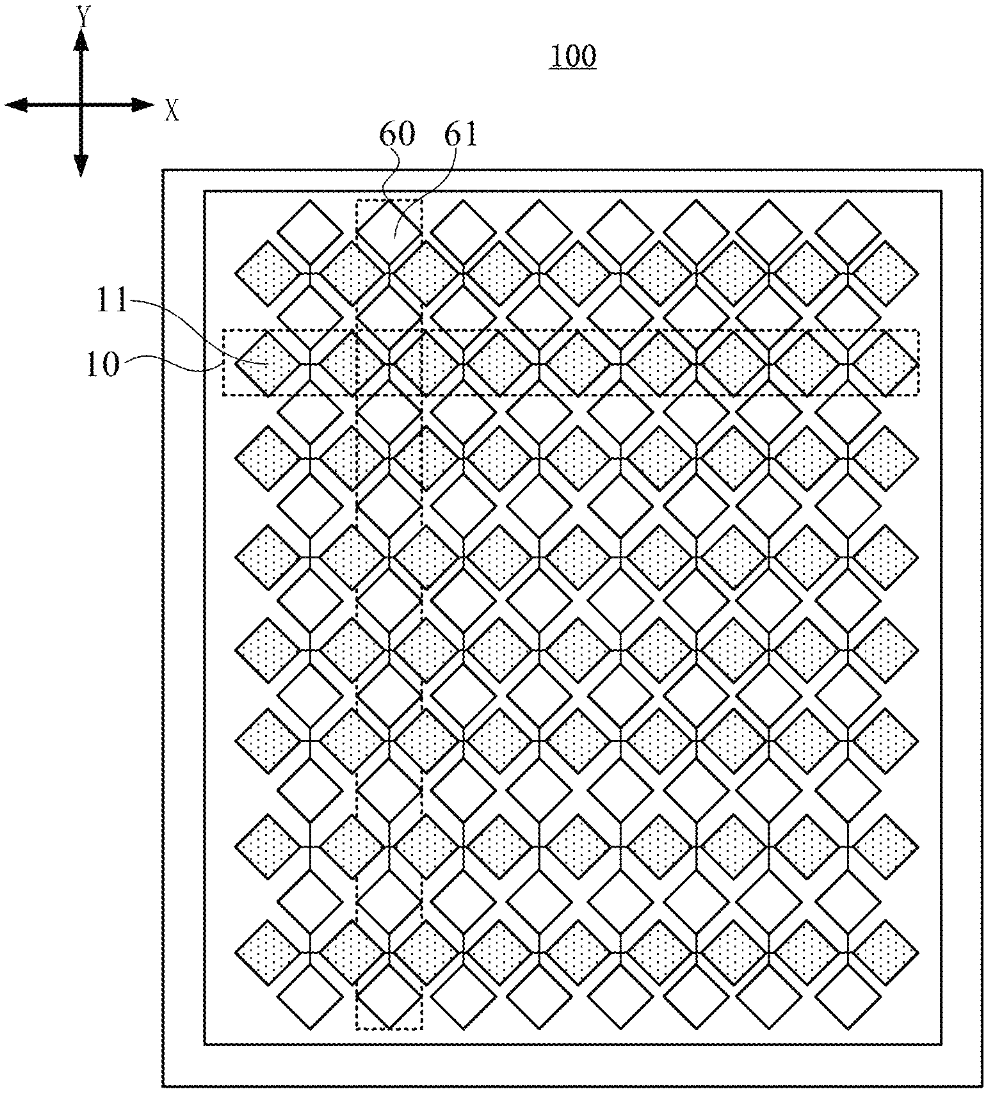
FIG. 6 shows yet another schematic structural top view of a display panel according to embodiments of the present application.

As another example, as shown in FIG. 6, the display panel may have a mutual-capacitance touch structure, and in the touch recognition stage, the touch electrodes 11 may be scanned progressively. The display panel may further include a sensing unit 60 including a plurality of sensing electrodes 61 arranged along the second direction Y, and a plurality of sensing units 60 are arranged along the first direction X. The sensing unit 60 and the touch unit 10 cross each other, and a mutual capacitance is formed between the touch electrode 11 and the sensing electrode 61. Under a condition that the touch recognition is performed, the driving chip provides the touch driving voltage to the touch electrodes progressively, then receives a sensing signal from the sensing electrode 61, and the sensing signal changes at the touch location to achieve the recognition of the touch location.

It should be noted that FIG. 6 is merely an example and is not intended to limit a specific touch structure.

Based on the same inventive concept, the embodiments of the present application further provide a display panel. Referring to FIG. 1 and FIG. 2, a display panel 100 according to the embodiments of the present application includes a touch unit 10 and a light-emitting device 20.

The touch unit 10 includes a plurality of touch electrodes 11 arranged along a first direction X, a plurality of touch units 10 are arranged along a second direction Y, and the first direction X intersects the second direction Y.

The light-emitting device 20 includes a first electrode 21, and here, the first electrode 21 is reused as the touch electrode 11.

Under a condition that an i-th touch unit 10 (*i*) is provided with a touch driving voltage, one touch unit 10 adjacent to the i-th touch unit 10 (*i*) is provided with a first voltage, and another touch unit 10 adjacent to the i-th touch unit 10 (*i*) is provided with a second voltage. Here, the first voltage is less than the touch driving voltage, and the second voltage is less than the touch driving voltage.

In an example, under a condition that the i-th touch unit 10 (*i*) is provided with the touch driving voltage, a touch unit not adjacent to the i-th touch unit 10 (*i*) is provided with a first power supply voltage, the first voltage is greater than the first power supply voltage, and the second voltage is greater than the first power supply voltage.

For example, under a condition that i=2, touch units 10 adjacent to a second touch unit 10 (2) include the first touch unit 10 (1) and the third touch unit 10 (3), and touch units 10 not adjacent to the second touch unit 10 (2) include touch units 10 from a fourth touch unit 10 (4) to the m-th touch unit 10 (*m*). The first touch unit 10 (1) may be provided with the first voltage, and the third touch unit 10 (3) may be provided with the second voltage.

With the display panel according to the embodiments of the present application, since under a condition that the i-th touch unit 10 (*i*) is provided with the touch driving voltage, two touch units 10 adjacent to the i-th touch unit 10 (*i*) are respectively provided with the first voltage and the second voltage between the touch driving voltage and the first power supply voltage, and the touch unit 10 adjacent to the i-th touch unit 10 (*i*) is provided with the first power supply voltage, in the embodiments of the present application, a voltage difference between a currently scanned i-th touch unit 10 (*i*) and its adjacent touch unit can be reduced, the currently scanned i-th touch unit 10 (*i*) may be in a stable voltage difference environment, and a risk of the currently scanned i-th touch unit 10 (*i*) being broken down can be reduced, so that a touch effect is improved, the possibility of display panel failure is reduced, and the performance of the display panel is improved.

Based on the same inventive concept, the embodiments of the present application further provide a display apparatus including the display panel according to any of the above embodiments.

The display apparatus according to the embodiments of the present application may be other display apparatus with display and touch function, such as, a mobile phone, a wearable product, a computer, a television, and a vehicle-mounted display apparatus, which is not limited in present application. The display apparatus according to the embodiments of the present application has the beneficial effects of the display panel according to the embodiments of the present application, reference is made to the specific description of the display panel in the above embodiments for details, which are not repeated herein.

Figures 7, 8:
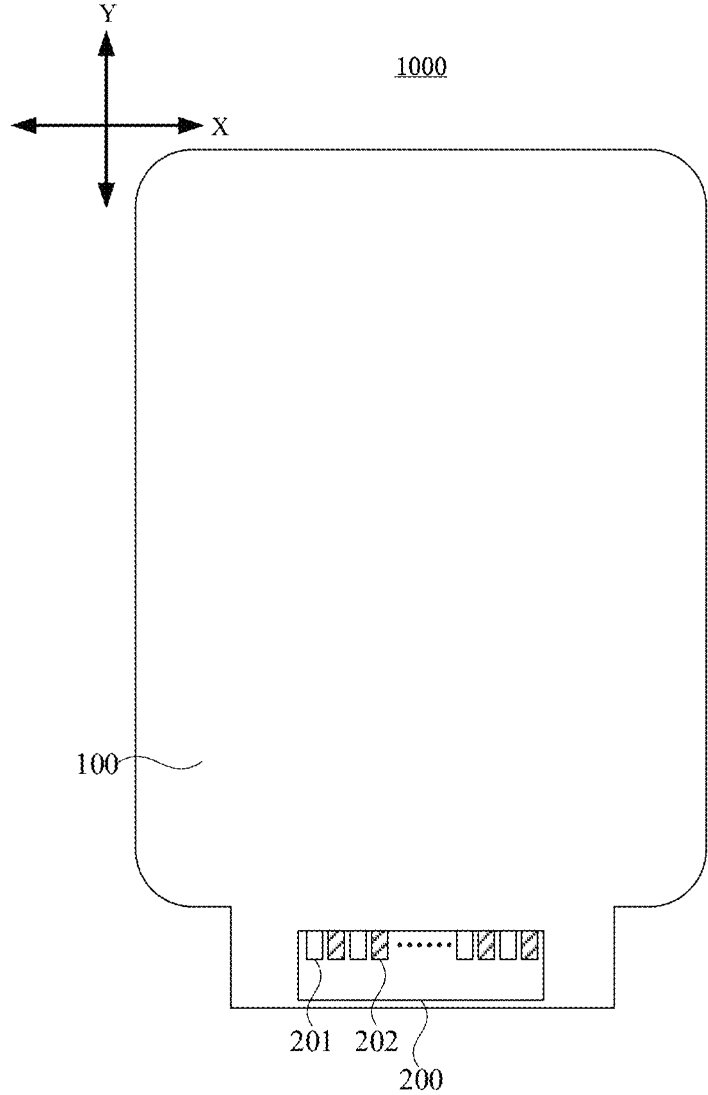
FIG. 7 shows a schematic structural view of a display apparatus according to embodiments of the present application.
FIG. 8 shows a schematic flow chart of a method for driving a display panel according to embodiments of the present application.

In some embodiments, as shown in FIG. 7, a display apparatus 1000 according to the embodiments of the present application may further include a driving chip 200 connected to the display panel 100, the driving chip 200 is configured to drive the display panel. The driving chip 200 may provide a touch driving voltage and a first voltage.

In the embodiments of the present application, the touch driving voltage and the first voltage are provided by the same driving chip 200, which is beneficial for simplifying the structure of the display apparatus.

In an example, the touch driving voltage and the first voltage may be generated by different circuits in the driving chip 200. The touch driving voltage and the first voltage may be provided to the touch unit through different pins.

As shown in FIG. 7, the driving chip 200 includes a first type pin 201 and a second type pin 202, the first type pin 201 is configured to provide the touch driving voltage, and the second type pin 202 is configured to provide the first voltage.

Referring to FIG. 4 and FIG. 7, the first type pin 201 may be connected to a second terminal of a first transistor T1, and the second type pin 202 may be connected to a second terminal of a second transistor T2.

As an example, the first type pin 201 may be further configured to provide the touch driving voltage and the first power supply voltage in a time-sharing manner. Under this condition, the driving chip 200 may provide the touch driving voltage, the first voltage, and the first power supply voltage, the driving chip 200 may be referred to as a Touch and Display Driver Integration (TDDI) chip, the driving chip 200 may have a selection circuit (not shown in the drawing) therein, and the selection circuit is connected to the first type pin 201, so that the first type pins 201 is provided with the touch driving voltage and the first power supply voltage in a time-sharing manner, and the first type pin 201 provides the touch driving voltage and the first power supply voltage to the display panel in a time-sharing manner.

As another example, the touch driving voltage and the first voltage may be provided by the same touch driving chip (TP IC), and the first power supply voltage may be provided by the display driving chip (DDIC). The display driving chip may be connected to the touch unit through a transistor, so that the touch unit may be provided with the touch driving voltage and the first power supply voltage in a time-sharing manner.

Based on the same inventive concept, the embodiments of the present application further provide a method for driving a display panel. The display panel includes: a plurality of touch units each including a plurality of touch electrodes arranged along a first direction, here, the plurality of touch units are arranged along a second direction, and the first direction intersects the second direction; and a light-emitting device including a first electrode reused as the touch electrode.

As shown in FIG. 8, the method according to the embodiments of the present application includes S80.

S80, providing, under a condition that an i-th touch unit is provided with a touch driving voltage, a first voltage to at least one touch unit adjacent to the i-th touch unit; here, the first voltage is less than the touch driving voltage.

In an example, S80 may further include: providing, under a condition that the touch driving voltage is provided to the i-th touch unit, a first power supply voltage to a touch unit not adjacent to the i-th touch unit, here, the first voltage is greater than the first power supply voltage.

With the display panel according to the embodiments of the present application, since the first voltage is provided to a touch unit adjacent to an i-th touch unit while the touch driving voltage is provided to the i-th touch unit, the first voltage is between the touch driving voltage and the first power supply voltage, and the first power supply voltage is provided to the touch unit adjacent to the i-th touch unit, in the embodiments of the present application, a voltage difference between a currently scanned i-th touch unit and its adjacent touch unit can be reduced, the currently scanned i-th touch unit may be in a stable voltage difference environment, and a risk of the currently scanned i-th touch unit being broken down can be reduced, so that a touch effect is improved, the possibility of display panel failure is reduced, and the performance of the display panel is improved.

In some embodiments, the touch driving voltage is greater than the first voltage, and the first voltage is greater than the first power supply voltage; and preferably, the first voltage is greater than 0 V.

In some embodiments, a difference between the touch driving voltage and the first voltage is a first difference, a difference between the first voltage and the first power supply voltage is a second difference, and an absolute value of the first difference is less than an absolute value of the second difference.

In some embodiments, the display panel includes a first operating condition and a second operating condition, and magnitudes of first voltages under the first operating condition and the second operating condition are different; and preferably, magnitudes of touch driving voltages under the first operating condition and the second operating condition are the same.

In some embodiments, a voltage difference between the touch driving voltage and the first voltage under the first operating condition is $\Delta V\mathbf{21}$, a voltage difference between the touch driving voltage and the first voltage under the second operating condition is $\Delta V\mathbf{22}$, and under a condition that a refresh frequency of the display panel under the first operating condition is greater than a refresh frequency of the display panel under the second operating condition, $|\Delta V\mathbf{21}|<|\Delta V\mathbf{22}|$.

In some embodiments, the display panel further includes a pixel circuit connected to the light-emitting device, the pixel circuit is provided with a light-emitting control signal configured to control whether the light-emitting device emits light.

The method according to the embodiments of the present application may further include: controlling, under a condition that the i-th touch unit is provided with the touch driving voltage, the light-emitting control signal provided to the pixel circuit connected to the i-th touch unit to be an OFF-level;

preferably, controlling, under a condition that a touch unit adjacent to the i-th touch unit is provided with the first voltage, the light-emitting control signal provided to the pixel circuit connected to the touch unit adjacent to the i-th touch unit to be the OFF-level; and preferably, controlling, under a condition that a touch unit adjacent to the i-th touch unit is provided with the first voltage, the light-emitting control signal provided to the pixel circuit connected to a touch unit not adjacent to the i-th touch unit to be an ON-level.

Based on the same inventive concept, the embodiments of the present application further provide a driving time sequence configured to drive the display panel according to any of the above embodiments, as shown in FIG. 3, an example is given in which an OFF-level of a time division multiplexing control signal (that is, a light-emitting control signal EM) is a high level and an ON-level is a low level, and the driving time sequence according to the embodiments of the present application includes:

in a touch scanning stage of the i-th touch unit, a time division multiplexing control signal of the i-th touch unit is an OFF-level, and a touch electrode of the i-th touch unit is inputted with the touch driving voltage;

a time division multiplexing control signal of a touch unit adjacent to the i-th touch unit is the OFF-level, and a touch electrode of the touch unit adjacent to the i-th touch unit is inputted with the first voltage; and the first voltage is less than the touch driving voltage.

In an example, in the touch scanning stage of the i-th touch unit, a time division multiplexing control signal of a touch unit not adjacent to the i-th touch unit is an ON-level, and a touch electrode of the touch unit not adjacent to the i-th touch unit is inputted with a first power supply voltage, the first voltage is greater than the first power supply voltage.

For example, in the touch scanning stage of the first touch unit, a high level light-emitting control signal EM is inputted to pixel circuits corresponding to the first touch unit and a second touch unit, and a low level light-emitting control signal EM is inputted to pixel circuits corresponding to a third touch unit and an m-th touch unit; and a touch driving voltage V1 is inputted to the first touch unit, a first voltage V2 is inputted to the second touch unit, and a first power supply voltage VSS is inputted to the third touch unit and the m-th touch unit.

For another example, in a touch scanning stage of the second touch unit, the high level light-emitting control signal EM is inputted to pixel circuits corresponding to the second touch unit, the first touch unit, and the third touch unit, and the low level light-emitting control signal EM is inputted to pixel circuits corresponding to a fourth touch unit and the m-th touch unit; and the touch driving voltage V1 is inputted to the second touch unit, the first voltage V2 is inputted to the first touch unit and the third touch unit, and the first power supply voltage VSS is inputted to the fourth touch unit and the m-th touch unit.

With the driving time sequence according to the embodiments of the present application, since under a condition that the i-th touch unit 10 (*i*) is provided with the touch driving voltage, at least one touch unit 10 adjacent to the i-th touch unit 10 (*i*) is provided with the first voltage between the touch driving voltage and the first power supply voltage, and the touch unit 10 adjacent to the i-th touch unit 10 (*i*) is provided with the first power supply voltage, in the embodiments of the present application, a voltage difference between a currently scanned i-th touch unit 10 (*i*) and its adjacent touch unit can be reduced, the currently scanned i-th touch unit 10 (*i*) may be in a stable voltage difference environment, and a risk of the currently scanned i-th touch unit 10 (*i*) being broken down can be reduced, so that a touch effect is improved, the possibility of display panel failure is reduced, and the performance of the display panel is improved.

In some embodiments, the display panel includes a first operating condition and a second operating condition, and the driving time sequence further includes: magnitudes of first voltages output under the first operating condition and the second operating condition are different. As such, the magnitudes of the first voltages may be flexibly set according to the environments of the touch unit under different operating conditions to flexibly adjust touch effects under different operating conditions.

In an example, magnitudes of touch driving voltages output under the first operating condition and the second operating condition are the same. Therefore, the same magnitude of touch driving voltages are provided under different operating conditions, and only the magnitude of the first voltage needs to be adjusted, which is beneficial for simplifying a driving time sequence.

In some embodiments, a voltage difference between the touch driving voltage and the first voltage output under the first operating condition is ΔV21, a voltage difference between the touch driving voltage and the first voltage output under the second operating condition is ΔV22, and under a condition that a refresh frequency of the display panel under the first operating condition is greater than a refresh frequency of the display panel under the second operating condition, $|\Delta V21|<|\Delta V22|$.

The less the absolute value of a difference between the touch driving voltage and the first voltage is, the closer the magnitudes of the touch driving voltage and the first voltage are. In the embodiments of the present application, the greater the refresh frequency is, the closer the first voltage is to the touch driving voltage, which is beneficial for the voltage provided to the touch unit to sufficiently change between the touch driving voltage and the first voltage in a relatively short duration.

It should be noted that the transistor in the embodiments of the present application may be an N-type transistor or a P-type transistor. For the N-type transistor, the ON-level is a high level and the OFF-level is a low level. That is, the N-type transistor is turned on under a condition that gate potential of the N-type transistor is at the high level and is turned off under a condition that gate potential of the N-type transistor is at the low level. For the P-type transistor, the ON-level is a low level and the OFF-level is a high level. That is, the P-type transistor is turned on under a condition that gate potential of the P-type transistor is at the low level and is turned off under a condition that gate potential of the P-type transistor is at the high level. In specific implementations, the gate of the transistor is used as its control terminal, and depending on a signal of the gate and the type of the transistor, its first terminal may be used as the source and its second terminal may be used as the drain, or alternatively, its first terminal may be used as the drain and its second terminal may be used as the source, which is not limited herein. Further, the ON-level and the OFF-level are used in a general sense in the embodiments of the present application, the ON-level refers to any level that can turn on the transistor, and the OFF-level refers to any level that can cut off/turn off the transistor.

The above embodiments of the present application do not exhaustively describe all the details and do not limit the present application to only the specific embodiments described. Obviously, many modifications and variations can be made based on the above description. These embodiments are selected and specifically described in the description to better explain the principles and practical applications of the present application, so that those skilled in the art can make good use of the present application and make modifications based on the present application. The present application is limited only by the claims, along with their full scope and equivalents.

What is claimed is:

1. A display panel, comprising:

a plurality of touch units each comprising a plurality of touch electrodes arranged along a first direction, wherein the plurality of touch units are arranged along a second direction, and the first direction intersects the second direction; and a light-emitting device comprising a first electrode reused as the touch electrode;

wherein under a condition that an i-th touch unit is provided with a touch driving voltage, at least one touch unit adjacent to the i-th touch unit is provided with a first voltage, and i is a positive integer; and the first voltage is less than the touch driving voltage, wherein under a condition that the i-th touch unit is provided with the touch driving voltage, a touch unit not adjacent to the i-th touch unit is provided with a first power supply voltage, and the first voltage is greater than the first power supply voltage, wherein the display panel further comprises a gating circuit, wherein an output terminal of the gating circuit is connected to the touch unit, a first input terminal of the gating circuit is provided with the touch driving voltage, a second input terminal of the gating circuit is provided with the first voltage, and a third input terminal of the gating circuit is provided with the first power supply voltage.

2. The display panel according to claim 1, wherein the first voltage is greater than 0 V.

3. The display panel according to claim 1, wherein a difference between the touch driving voltage and the first voltage is a first difference, a difference between the first voltage and the first power supply voltage is a second difference, and an absolute value of the first difference is less than an absolute value of the second difference.

4. The display panel according to claim 1, wherein the gating circuit comprises a first transistor and a second transistor, a first electrode of the first transistor and a first electrode of the second transistor are connected to each other and used as the output terminal of the gating circuit, a second electrode of the first transistor is used as the first input terminal of the gating circuit, and a second electrode of the second transistor is used as the second input terminal of the gating circuit.

5. The display panel according to claim 1, further comprising a pixel circuit connected to the light-emitting device, wherein the pixel circuit is provided with a light-emitting control signal, and the light-emitting control signal comprises an ON-level controlling the light-emitting device to turn on and an OFF-level controlling the light-emitting device to turn off; and under a condition that the i-th touch unit is provided with the touch driving voltage, the light-emitting control signal provided to the pixel circuit connected to the i-th touch unit is the OFF-level.

6. The display panel according to claim 5, wherein under a condition that a touch unit adjacent to the i-th touch unit is provided with the first voltage, the light-emitting control signal provided to the pixel circuit connected to the touch unit adjacent to the i-th touch unit is the OFF-level.

7. The display panel according to claim 5, wherein under a condition that a touch unit adjacent to the i-th touch unit is provided with the first voltage, the light-emitting control signal provided to the pixel circuit connected to a touch unit not adjacent to the i-th touch unit is the ON-level.

8. The display panel according to claim 1, wherein a driving time sequence is configured to drive the display panel, and the driving time sequence comprises:

in a touch scanning stage of the i-th touch unit, a time division multiplexing control signal of the i-th touch unit is an OFF-level, and a touch electrode of the i-th touch unit is inputted with the touch driving voltage; and a time division multiplexing control signal of a touch unit adjacent to the i-th touch unit is the OFF-level, and a touch electrode of the touch unit adjacent to the i-th touch unit is inputted with the first voltage;

the first voltage is less than the touch driving voltage; and in the touch scanning stage of the i-th touch unit, a time division multiplexing control signal of a touch unit not adjacent to the i-th touch unit is an ON-level, and a touch electrode of the touch unit not adjacent to the i-th touch unit is inputted with a first power supply voltage, the first voltage is greater than the first power supply voltage.

9. The display panel according to claim 8, wherein the display panel comprises a first operating condition and a second operating condition, the driving time sequence further comprises:

magnitudes of first voltages output under the first operating condition and the second operating condition are different;

magnitudes of touch driving voltages output under the first operating condition and the second operating condition are the same; and a voltage difference between the touch driving voltage and the first voltage output under the first operating condition is $\Delta V21$, a voltage difference between the touch driving voltage and the first voltage output under the second operating condition is $\Delta V22$, and under a condition that a refresh frequency of the display panel under the first operating condition is greater than a refresh frequency of the display panel under the second operating condition, $|\Delta V21|<|\Delta V22|$.

10. A display apparatus, comprising the display panel according to claim 1.

11. The display apparatus according to claim 10, wherein the display apparatus further comprises a driving chip configured to provide the touch driving voltage and the first voltage.

12. The display apparatus according to claim 11, wherein the driving chip comprises a first type pin and a second type pin, the first type pin is configured to provide the touch driving voltage, and the second type pin is configured to provide the first voltage.

13. The display apparatus according to claim 12, wherein the first type pin is configured to provide the touch driving voltage or the first power supply voltage.

* * * * *